Patented June 3, 1952

2,599,349

UNITED STATES PATENT OFFICE 2,599,349

GREEN-COLORED OPAL GLASS

Richard W. Ricker, Parkersburg, W. Va., assignor to Libbey-Owens-Ford Glass Company, Toledo, Ohio, a corporation of Ohio No Drawing. Application May 23, 1947, Serial No. 750,173

2 Claims. (Cl. 106—52)

This invention relates to colored glasses and more particularly to a green colored opal glass and batch therefor.

Heretofore it has been the common practice to use chromium oxide as the coloring agent in producing green opal glasses. Ordinarily, potassium dichromate or sodium dichromate are used as raw materials to introduce the chromium oxide into the melt, although occasionally the pure chromic oxide ($Cr_2O_3$) is used in the batch.

One of the principal disadvantages in the use of chromium oxide is the fact that it increases the viscosity of the glass and makes it more difficult to melt. This usually makes necessary the addition of extra fluxing agents, such as soda ash, to most green glass batches, and, even with these additions, considerably higher furnace temperatures must ordinarily be carried. Also, when used to make darker shades of green, the larger amounts of chromium oxide tend to crystallize out of the melt. This crystallization, sometimes purposely produced in art ware, is called "Aventurine."

Among the objects of this invention is the provision of an improved batch for green colored opal glass which can be more easily melted with lower furnace temperatures than heretofore; which will enable increased production; which will result in a finished glass of greatly improved quality, and which will not fade or change its color on prolonged exposure to sunlight.

Briefly stated, these and other objects of the invention are accomplished by using vanadium pentoxide ($V_2O_5$) to replace all or a large portion of the sodium or potassium dichromate in the making of green colored opal glasses. This is generally done by mixing with a white glass batch proper, in which fluorides are used as an opacifying agent, predetermined quantities of a dichromate and vanadium pentoxide, each of which contributes to give the desired shade. Thus, chromium oxide produces a yellowish green color and usually it is necessary to add a small amount of cobalt with the chromium to produce a more pleasant shade of green. The vanadium pentoxide alone in the white glass batch proper produces a bluish green color, and it was found desirable to add a small amount of dichromate to increase the intensity of the green color and give it a slightly yellowish cast, which color experts judge to be more desirable.

The white glass batch proper may be of the following composition:

| | Pounds |
|---|---|
| Sand | 1000 |
| Soda ash | 250–320 |
| Feldspar | 250–325 |
| Barium carbonate | 0–20 |
| Barium sulphate | 0–20 |
| Borax | 0–40 |
| Zinc oxide | 15–100 |
| Fluorspar | 100–160 |
| Sodium silico fluoride | 80–210 |
| Antimony trioxide | 1–5 |

To the above white base glass batch, the sodium or potassium dichromate and vanadium pentoxide are added in approximately the following amounts:

| | Pounds |
|---|---|
| Sodium or potassium dichromate | 0–5 |
| Vanadium pentoxide | 5–20 |

The sodium dichromate is dissolved in an equal weight of water before being mixed with the batch while a relatively larger amount of water is used with the potassium dichromate.

It has been found that the optimum amount of vanadium pentoxide is about 10 pounds to 1000 pounds of sand in the batch, or about 0.5% of the $V_2O_5$ in the finished glass. The technical grade of vanadium pentoxide which analyzes 83–85% $V_2O_5$ is preferably used. The optimum amount of dichromate is 2 to 3 lbs. per 10 lbs. of vanadium. When producing the glass of this invention, the dichromate and vanadium pentoxide are mixed with the ingredients of the base white batch and melted in a glass furnace. While sodium dichromate is preferred, potassium dichromate can be used or, if desired, pure chromic oxide ($Cr_2O_3$) can be employed. The proportion of the coloring agents may be varied within limits depending upon the particular shade desired, and in some cases the dichromate may be entirely omitted.

The green colored fluoride opal glass made from the above batch will be of substantially the following calculated composition:

| Constituents: | Percent |
|---|---|
| $SiO_2$ | 66.80 |
| $Fe_2O_3$ | .03 |
| $Al_2O_3$ | 3.15 |
| $TiO_2$ | .01 |
| CaO | 4.80 |
| BaO | .80 |
| ZnO | 3.20 |
| $Na_2O$ | 13.70 |
| $K_2O$ | 1.87 |
| $B_2O_3$ | .79 |
| $Sb_2O_5$ | .27 |
| $Cr_2O_3$ | .05 |
| $V_2O_5$ | .45 |
| $F_2$ | 7.03 |
| $O_2 \leftrightharpoons F_2$ | −2.95 |
| Total | 100.00 |

The reduction in the amount of dichromate used and the addition of the vanadium pentoxide results in a much easier melting batch. Thus, the vanadium pentoxide improves the melting to such an extent that it offsets the adverse melting effect of the relatively small amount of dichromate. Moreover, it was found possible to use furnace temperatures 60 degrees to 100 degrees F. lower than when producing an all-dichromate green glass. Notwithstanding the use of lowered furnace temperatures, production (tonnage melted per day and good square feet of glass produced per day) was increased about 30 percent over green glass using only dichromate as the coloring material. In addition, this greater production was of a substantially better quality than any previous production (fewer metal defects such as seeds, bubbles, stones, cord and streaks).

The glass of this invention also will not show any visible change in color on prolonged exposure to sunlight notwithstanding the fact that glasses containing vanadium are well recognized as being very susceptible to changes in color on exposure to sunlight. It is believed that this is due to the fact that the composition of the batch herein provided is such that it maintains the vanadium in its most stable form.

I claim:

1. A green colored opal glass having substantially the following calculated composition:

| | Percent |
|---|---|
| $SiO_2$ | 66.80 |
| $Fe_2O_3$ | .03 |
| $Al_2O_3$ | 3.15 |
| $TiO_2$ | .01 |
| CaO | 4.80 |
| BaO | .80 |
| ZnO | 3.20 |
| $Na_2O$ | 13.70 |
| $K_2O$ | 1.87 |
| $B_2O_3$ | .79 |
| $Sb_2O_5$ | .27 |
| $Cr_2O_3$ | .05 |
| $V_2O_5$ | .45 |
| $F_2$ | 7.03 |
| $O_2$–$F_2$ | −2.95 |

2. A green colored opal glass containing about 0.5% vanadium pentoxide and about .05% chromic oxide.

RICHARD W. RICKER.

REFERENCES CITED

The following references are of record in the file of this patent:

UNITED STATES PATENTS

| Number | Name | Date |
|---|---|---|
| 1,332,058 | Musiol | Feb. 24, 1920 |
| 1,572,625 | Taylor | Feb. 9, 1926 |
| 1,754,182 | Taylor | Apr. 8, 1930 |
| 2,068,801 | Hood et al. | Jan. 26, 1937 |
| 2,219,122 | Weidert | Oct. 22, 1940 |
| 2,237,042 | Truby | Apr. 1, 1940 |
| 2,475,470 | Bennett et al. | July 5, 1949 |